United States Patent [19]

Raspor et al.

[11] Patent Number: 4,931,121

[45] Date of Patent: Jun. 5, 1990

[54] PROCESS FOR FORMING A PLASTIC ARTICLE FROM A PLURALITY OF LAYERS OF THERMOPLASTIC MATERIAL

[75] Inventors: Otto C. Raspor, Saginaw; James C. Pawloski, Bay City, both of Mich.

[73] Assignee: The Dow Chemical Company, Midland, Mich.

[21] Appl. No.: 737,298

[22] Filed: May 23, 1985

[51] Int. Cl.$^5$ .................. B29C 51/14; B29C 65/02
[52] U.S. Cl. ................................. 156/213; 156/292; 156/308.4; 156/309.3; 156/309.9; 264/248; 264/249; 264/292; 264/294; 264/322
[58] Field of Search ............... 264/320, 322, 510, 512, 264/522, 544, DIG. 57, DIG. 66, 105, 112, 292, 517, 323, 545, 248, 249, 294; 156/224, 245, 322, 324.4, 213, 292, 308.4, 309.3, 309.9

[56] References Cited

U.S. PATENT DOCUMENTS

| | | | |
|---|---|---|---|
| 2,975,487 | 3/1961 | Williams, Jr. | 264/322 X |
| 3,466,214 | 9/1969 | Polk et al. | 156/213 |
| 3,470,291 | 9/1969 | Johnson | 264/292 |
| 3,532,786 | 12/1967 | Coffman | 264/292 |
| 3,739,052 | 6/1973 | Ayres et al. | 264/512 |
| 4,323,531 | 4/1982 | Bradley et al. | 264/113 |
| 4,357,381 | 11/1982 | Wilson | 264/322 X |
| 4,384,016 | 5/1983 | Ide et al. | 156/308.2 X |
| 4,563,325 | 1/1986 | Coffman | 264/550 |

FOREIGN PATENT DOCUMENTS 259260 5/1963 Australia .

Primary Examiner—Jeffery Thurlow
Assistant Examiner—Leo B. Tentoni

[57] ABSTRACT

A process for forming a plastic article, such as a container, involves heating at least one or more layers individually to temperatures below the melting point, immediately stacking two or more layers while retaining the peripheral portion of the layers and immediately forming the stacked layers into a plastic article which is then allowed to cool. Alternatively after stacking the layers, the stacked layers are immediately forged into a preform in a heated and lubricated mold and immediately thermoformed into a plastic article, which is then allowed to cool. The layers may be diverse (i.e. material, shape, molecular weight, additives, etc.) or similar and stacked so as to provide a layered angular orientation.

14 Claims, No Drawings

PROCESS FOR FORMING A PLASTIC ARTICLE FROM A PLURALITY OF LAYERS OF THERMOPLASTIC MATERIAL

BACKGROUND OF THE INVENTION

1. Field of the Invention

This invention relates to a process for forming a plastic article from a plurality of layers of thermoplastic material. More, particularly, at least one layer of the plurality of layers is heated separately to a temperature not to exceed the melting temperature of any thermoplastic material in the layer to be heated and the plurality of layers is stacked, prior to forming the stacked plurality of layers into a plastic article. The plurality of layers of thermoplastic material may be diverse, or may be similar and stacked so as to provide a layered angular orientation prior to forming.

2. Description of the Prior Art

U.S. Pat. No. 3,739,052 to Ayres et al. describes a scrap free process for rapidly making containers from a multilayered or homogeneous thermoplastic blank. This blank is preheated, immediately forged into a preform, and then thermoformed into a container.

U.S. Pat. Nos. 4,323,531 and 4,352,766 to Bradley et al., teach a process for making plastic articles from resinous powders. The resinous powders are initially compressed into briquettes which may be homogeneous, blended or multilayered and may contain a chemical blowing agent. The briquette is then heated to a temperature in the range from about the alpha transition temperature to less than the melt temperature of the polymer to somewhat soften and sinter the briquette. The sintered briquette is then useful as a blank in an essentially scrap-free, substantially solid phase, relatively low temperature process and may be forged into a preform and subsequently, or at a later time, thermoformed into a plastic article.

U.S. Pat. No. 4,510,108 to Cleereman et al., teach two additional methods for preparing a compressed resinous powder briquette useful as a blank in an essentially scrap-free, solid phase process. It is an improvement of the process disclosed in U.S. Pat. No. 4,323,531.

However several particular problems still exist in such a process when utilizing a single thermoplastic blank or a single compressed powder briquette of some homogenous materials or multilayered diverse materials.

A first problem with some single blank or briquette of multilayered diverse materials is forming viscosity. Individual resins, due to molecular architecture, have specific viscosity versus temperature curves and thus a specific viscosity-temperature range in which thermoforming of the resin may occur. Multilayer sheet blanks or multilayer compressed powder briquettes having at least two layers of diverse materials may encounter forming viscosity problems. If the forming viscosities of the diverse resins are similar, "plug flow" (i.e., flow approaching the uniform velocity profile of a cross-section) of the multilayer blank or briquette will take place so that partial or complete disruption of the multilayer blank or briquette does not take place. If, however, the forming viscosities of the diverse resins in the multilayer blank or briquette are not similar, partial or complete disruption of the multilayer blank or briquette layer structure may occur due to nonuniform flow of one or more layers of the diverse resins.

U.S. Pat. No. 3,739,052 states that multilayer blanks or briquettes, of two or more diverse resins, will have different forming temperatures and softening points than their individual layers of diverse resins. Thus, an optimum forming temperature must be determined for a multilayer blank or briquette. It has been found according to U.S. Pat. No. 3,739,052 that the forming temperature of a multilayer blank or briquette is ordinarily dominated by the forming temperature of the layer in contact with the forming surface. Sometimes though, due to widely divergent forming viscosities, an optimum temperature for a multilayer blank or briquette may not be achievable due to deleterious effects to one or more of the layers of diverse resin material. These deleterious effects may include, loss of barrier properties, loss of physical or mechanical properties, color degradation or inability to fabricate.

A second problem with a single blank or briquette of multilayered diverse materials is that of resin degradation. This degradation, be it in color, barrier or mechanical properties, can be extremely severe. Anytime a single multilayer blank or briquette of diverse materials is heated for a specific time and at a specific temperature to reach an optimum processing temperature for the single multilayer blank or briquette and that specific heating time, temperature or combination of time and temperature exceeds an allowable heating time, temperature or combination of time and temperature for any one of the diverse materials, that material will degrade to some extent. For example, when using SARAN resin (a vinylidene chloride based homopolymer or copolymer) with a material having a substantially higher processing temperature than SARAN resin, for example polycarbonate, in a single multilayer blank obtained for example, by coextrusion or lamination, severe degradation will result to the SARAN resin due to the heating time, temperature or combination of time and temperature necessary to reach a processing temperature for a single multilayer blank of polycarbonate and SARAN resin. While SARAN resin is particularly sensitive to heat degradation, other resins can experience similar effects, differing only by degree.

Producing a plastic article in the above manner imposes a need to heat the single multilayer blank or briquette twice, or at the very least, for a period of time exceeding that of the present invention. A first heating is required to produce the single multilayer blank or briquette and a second heating, or at the very least, an extended time of the first heating is required before forming the single multilayer blank or briquette into a plastic article.

Single multilayer blanks or multilayer briquettes may not be able to overcome molecular architecture constraints when utilizing some combinations of diverse resins in a single layered blank. These molecular architecture constraints include forming viscosity and resin degradation. A single thermoplastic blank of homogenous material or an oriented material (e.g., fiber-oriented) may also encounter problems of nonuniform orientation. A uniform circumferential orientation is desirable to avoid problems with dimensional stability, nonuniform physical properties and material distribution.

Thus, there exists a need for a process to overcome these problems.

SUMMARY OF THE INVENTION

The present invention comprises a process for forming a plastic article from a plurality of layers of thermoplastic material. At least one layer of the plurality of layers is heated to a temperature not to exceed the melting temperature of any material in that layer. The plurality of layers of thermoplastic material will be sufficient to form the plastic article. The layers may be diverse or similar. Immediately after heating and immediately prior to forming the plurality of layers are stacked. If the layers are similar, the layers will be stacked so as to provide a layered angular orientation. After stacking, the peripheral portion of the stacked plurality of layers of thermoplastic material is retained, immediately formed into the plastic article and permitted to cool. In a second embodiment, after stacking, lubrication is provided for the plurality of layers of thermoplastic material sufficient to permit substantial plug flow during forging; the plurality of layers are forged in a mold heated at least as high as the lowest softening temperature of any thermoplastic material present into a preform whose peripheral portion is retained while being cooled below the softening temperature; the preform is immediately thermoformed into the plastic article and the plastic article is permitted to cool.

The present invention avoids the problems which occur when utilizing a single blank of homogenous material, or a single blank of multilayered diverse materials. These problems, which include, but are not limited to, forming viscosity, resin degradation and nonuniform orientation are overcome thru separate treatment of individual layers, when heating, stacking or both.

Excessive heat history is avoided by separate treatment of individual layers in the present invention, thus greatly minimizing resins degradation problems. If an individual layer is to be heated, the temperature to which that individual layer is heated and the time for which that individual layer is heated may be closely controlled. One may also control heating of individual layers, by stacking one or more heated layers with one or more unheated layers immediately prior to forming a plastic article.

Several types of plastic articles may be produced by the process of the present invention. For example, a container which is partially opaque and partially transparent may show the container contents to the best advantage or the amount of container contents remaining. The plastic article could be a conveyor bucket having a rigid core material encapsulated in a rubbery abrasion-resistant material, with or without orientation. The plastic article could also be a decorative container in which geometrical forms of various colors with various imprints are encapsulated. Plastic articles may be formed with a core layer of a barrier material, such as, for example, SARAN resin or an ethylene-vinyl alcohol copolymer, between, preferably encapsulated between, layers of other thermoplastic materials, such as, for example, polypropylene. Plastic articles may be formed with a core layer of a fiber composite material for improved strength and macroscopic orientation. Plastic articles formed from stacked layers of uniaxially oriented thermoplastic material having a layered angular orientation will provide a more uniform orientation.

DETAILED DESCRIPTION OF ILLUSTRATIVE EMBODIMENTS

The present invention relates to a process for forming a plastic article from a plurality of layers of thermoplastic material, wherein the layers are diverse or similar.

The forming of thermoplastic articles from a single homogeneous or multilayer blank from sheet has been taught in U.S. Pat. No. 3,739,052. This is incorporated in full by reference.

The forming of thermoplastic articles from a single homogeneous, blended or multilayer briquette of powdered thermoplastic resin materials has been taught in U.S. Pat. Nos. 4,323,531, 4,352,766 and 4,510,108. These patents are also incorporated in full by reference.

The plurality of layers of thermoplastic material may be diverse. The definition of diverse layers includes: (a) layers of different thermoplastic material, for example polycarbonate and SARAN resin or polypropylene and SARAN resin; (b) layers of the same thermoplastic material having differing molecular weights, for example, ultra high molecular weight polyethylene and high density polyethylene; (c) layers of the same or different thermoplastic materials having differing shapes, for example, ribs of polystyrene may be encapsulated between blanks of high impact polystyrene or high density polyethylene; (d) layers of the same material containing different fillers or additives, for example, polystyrene containing titanium dioxide and polystyrene containing carbon black; and most broadly (e) layers of any thermoplastic materials, be they similar or diverse which for purposes of processing (i.e. heating, forming a plastic article with special features, etc.) require a variation in the layer itself or a differentiation in the manner in which a layer is processed.

The term thermoplastic material includes thermoplastic material having additives, fillers, fibers, etc. which may be organic or inorganic.

The plurality of layers of thermoplastic material may also be similar. These similar layers of thermoplastic material may be oriented and the orientation may be present on a molecular level or a macroscopic level.

If the orientation is present on a molecular level, the use of similar layers of thermoplastic material uniaxially or biaxially oriented, for example, by stretching, stacked so that individual layer orientations are not aligned (i.e., in register), that is to say in a layered angular orientation around a common central layer axis, may improve the uniformity of orientation in the formed plastic article.

On a macroscopic level, similar layers of thermoplastic material may themselves contain fibers or be a fiber composite. These similar layers may also be stacked in a layered angular orientation.

Even polygonal layers of thermoplastic material having no orientation may be angularly disposed around a common central layer axis, relative to each other in a circular mold so as to have a layered angular orientation, upon formation into a plastic article, and a more uniform orientation. For example, a stack of adjacent, relatively flat square layers may have their corners staggered so that a corner of one layer overlays a side of the next down layer (rather than in register, that is overlaying a corner of the next lower layer) and thus are in a layered angular orientation.

By not stacking a plurality of similar layers in register, either by orientation or shape, and instead angularly disposing the adjacent similar layers relative to each other around a common central layer axis so as to provide a layered angular orientation, the orientation of the plastic article, either on a molecular level or a macroscopic level, becomes more uniform. A uniform orientation is desirable to avoid problems with dimensional stability and nonuniform physical properties.

Diverse layers of thermoplastic material may also be stacked adjacent to each other on their major faces while being angularly disposed, by orientation or shape, relative to each other around a common central layer axis, the axis perpendicular to the major faces of the diverse layers, so as to provide a layered angular orientation. Also contemplated is a stacked plurality of diverse layers of thermoplastic material wherein not all diverse layers of thermoplastic material are in a layered angular orientation.

Individual layers may be homogenous, blended or multilayered structures. Individual layers, called blanks, may be prepared from a sheet which has been coextruded, compression molded, injection molded or prepared in any other suitable manner. These blanks may be round, polygonal or any other desired shape. Individual layers may also be a briquette prepared from powdered thermoplastic resin materials as described in U.S. Pat. Nos. 4,323,531, 4,352,766 and 4,510,108.

A one piece or single blank or a one piece or single briquette can be heated to a temperature less than a melting temperature of the material forming the blank or briquette, and squeezed or forged into a preform which is immediately or at a later time thermoformed into a desired plastic article. Some problems may occur with relatively thick one piece or single multilayer blanks and relatively thick one piece or single multilayer briquettes. Relatively thick single multilayer blanks and briquettes need to flow uniformly in the mold under plug flow conditions. In plug flow conditions the velocity through the thickness of the sheet is relatively constant. This is in contrast to the usual parabolic flow pattern observed in conventional molding of polymers in a viscous state where the velocity varies from zero at the mold surfaces to a maximum near the mold center. Plug flow is achieved by reducing frictional drag at the mold surface, by lubricating the contacting mold surfaces or the single multilayer blank or single multilayer briquette contacting surfaces. Both blank and mold surfaces may also be lubricated. Lubrication may be provided at any step prior to forging.

However, lubrication may be ineffective for layers of diverse materials in a single, relatively thick multilayer blank or a single relatively thick multilayer briquette that has been heated to one forming temperature, due to a large difference in the forming viscosities of the diverse material at that particular forming temperature. A wide difference in forming viscosities may cause partial or complete layer disruption upon forming or forging a single relatively thick multilayer blank o briquette.

By forming viscosity is meant the viscosity of a particular thermoplastic material at a given forging or forming temperature and deformation rate. The forming viscosity at a given temperature and deformation rate is determined by the molecular architecture of the particular thermoplastic material. Additives in the thermoplastic material may affect the forming viscosity, but the use of additives may not be desirable for other reasons, such as an adverse effect on physical properties or barrier properties.

Thus, in the present invention thermoplastic material having widely varying forming viscosities at a given temperature and deformation rate may, as individual layers, be heated separately, for a period of time, to obtain a desired forming viscosity for each individual layer, immediately prior to stacking the individual layers and forming a plastic article.

Also, heating to one forming temperature may be harmful to those thermoplastic materials in a single multilayer blank or briquette which are heat sensitive and degrade with an excessive heat history during processing.

By heat history is meant the number of times, the length of time and the temperature to which a thermoplastic material is subjected. For example, certain SARAN resins are known to degrade when subjected to an excessive heat history. Other thermoplastic materials which are sensitive to an excessive heat history include, but are not limited to homopolymers and copolymers of polyacrylonitrile, polyvinyl alcohol and certain flurocarbon polymers. The present invention allows heat sensitive thermoplastic materials to be utilized. Individual layers of heat sensitive thermoplastic materials may be heated separately or not at all to control the temperature and time of heating for that individual layer prior to stacking the plurality of layers and forming.

The requirement of a single forging or forming temperature for a relatively thick single multilayer blank or briquette is avoided in the present invention, thus eliminating forming viscosity and thermal degradation problems. By separately heating and subsequent stacking layers of diverse material, forming viscosities of thermoplastic materials may be adjusted. The use of varying optimum temperatures and heating times for individual layers of thermoplastic material avoids these problems.

Also, since individual layers are heated separately, the heating is generally more rapid. For example, three 20 gram homogeneous blanks are usually heated more rapidly than a single 60 gram homogenous blank of the same thermoplastic material.

As stated previously, another advantage of the present invention is that highly oriented relatively thick plastic articles may be made more readily than by other methods. Individual polygonal blanks of similar or diverse thermoplastic material may be angularly disposed around a common central layer axis in a circular mold relative to each other, so as to provide a layered angular orientation which is more uniform than the orientation obtained when the blanks are stacked in register, that is having no angular disposition around a common central layer axis. Since a polygonal blank is not stretched an equal distance in all directions when being forged into a circular preform, the stacking of individual layers with relative angular dispositions more closely approximates a circular blank in which all stretching is for equal distances in a circular mold.

For example, two relatively flat square layers may be stacked on their major faces adjacent to each other while also disposed at an angle of 45 degrees to each other. This angular disposition of layers permits the fabrication of three-dimensional hollow thermoplastic articles with much more uniform molecular or crystalline circumferential orientation than that obtainable from fabrication of polygonal layers having no angular disposition. This layered angular orientation also improves the uniformity of the wall thickness of the plastic article and the uniformity of material distribution.

Oriented layers of similar or diverse thermoplastic material are also useful. Oriented and similar layers, where orientation is imparted on a molecular level, such as by stretching a sheet of thermoplastic material from which individual blanks are obtained or layers where orientation is imparted on a macroscopic level, for example, when fibers are used to provide orientation, are also useful as blanks.

Molecularly oriented and similar layers produced for example, by uniaxial or biaxial stretching, are stacked so as to provide a molecular layered angular orientation.

The use of an oriented impregnated fiber layer or a continuous fiber material, such as a screen fabric which is an air-fiber composite blank allows easy close control of the orientation on a macroscopic level. If the fiber material is continuous, such as a screen fabric, the fiber material must be such that it will deform without breaking or separating from the other layers of thermoplastic material.

Thus, on a molecular level or a macroscopic level, it is possible, with the present invention to form oriented plastic articles in which the direction of the orientation is closely controlled. This uniformity of orientation improves dimensional stability and the uniformity of physical properties, wall thickness and material distribution.

A single individual layer need not be only a circular or polygonal blank. A layer may be, for example, one or more ribs encapsulated between layers of the same or a different thermoplastic material. The strength of the thermoplastic article can be controlled by changing rib layer thermoplastic materials, by adjusting the number of ribs or by adjusting the position of the ribs, all of which changes are easily accomplished without tooling changes.

Other layer configurations are also possible and may be desirable depending on the plastic article requirements and usage.

Although encapsulation of a core layer is not a necessary requirement of the present invention, when encapsulation is desired, the encapsulating layers should be capable of coalescing so the encapsulating layers form an integral surface around the core layer. Also, for optimum mechanical property enhancement of the plastic article there should be adhesion between the core layer material and the encapsulating layer material. Adhesion may be directly between the core layer material and the encapsulating layer material or an adhesive layer may be used in the stacked plurality of layers. However there may be examples of plastic articles where adhesion is not desirable or necessary.

Encapsulation of a core, which may be one or more layers, may be accomplished by making a core layer disk smaller in diameter than the first and last encapsulating layer disk diameters. Preferably, the first and last encapsulating layer disks are of similar thermoplastic material. Encapsulation may also be accomplished by controlling the heating and thus the forming viscosity and plug flow characteristics of the individual layers of diverse material.

Encapsulation of a core layer is especially useful for two reasons. First, by completely encapsulating a core layer material, the degree of adhesion necessary between layers is reduced. There is no external layered structure at a periphery which could function as a starting point for delamination of the layered structure and thus there is a reduced need for an adhesive layer. Second, encapsulation of a core layer provides better protection for the core layer material. By encapsulating, no exposed layer edges are present, and there are no points of entry for chemicals or moisture which may affect barrier or mechanical properties. Also, for example, a rigid abrasion sensitive core layer may be encapsulated between two rubbery abrasion resistant layers.

Thermoplastic resins which may be utilized in the present process are formed from polymers which may be classified as either amorphous or crystalline. The term crystalline also includes those polymers referred to as semi-crystalline.

The versatility of the present process is illustrated by the various following specific examples. In all examples, the actual forming of the plastic articles is done substantially according to the teachings of U.S. Pat. No. 3,739,052.

EXAMPLE 1

Two 3.5 inch diameter, 0.25 inch thick disks are cut from a transparent, uncolored general purpose polystyrene (GPPS) compression molding. A single 3 inch diameter, 0.1 inch thick disk is cut from a colored extruded sheet of high-impact polystyrene (HIPS). These disks are then heated separately at 115° C. for about 40 minutes in a forced air oven. These disks are then stacked and aligned on a common center layer axis GPPS/HIPS/GPPS and immediately forged between heated, lubricated anvils and formed into a shallow pan of about 7 inches in diameter and 1.75 inches deep. The result is a plastic article which is colored except for a transparent lip structure. The surface of the plastic article is high gloss while the core of the plastic article is tough.

EXAMPLE 2

One 5 inch diameter, 0.25 inch thick disk of polypropylene (PP) and one 4.75 inch diameter, 0.25 inch thick HIPS disk are prepared. These disks are then heated separately, the PP at about 168° C. for about 30 minutes and the HIPS at about 127° C. for about 15 minutes in a forced air oven. These disks are then stacked, forged and formed between heated lubricated anvils into a useful plastic container. The container has an interior PP layer providing chemical resistance and an exterior HIPS layer providing impact resistance and rigidity.

EXAMPLE 3

Two 5 inch diameter, 0.150 inch thick PP disks are prepared. Also prepared are three foliated polystyrene (PS) blanks which are 3.5 inches wide, 0.150 inches thick and whose two rounded edges and greatest length correspond to a 4.75 inch diameter circle.

By foliated, it is meant that the width of the blanks has a layered arrangement, each layer constituting a fractional width of the total width. The layers in this instance are clear and red polystyrene. The three foliated PS blanks are stacked and angularly disposed about 60 degrees around a common central layer axis relative to neighboring blanks and are heated while stacked at about 129° C. for about 20 minutes. The PP disks are heated at about 167.5° C. for about 20 minutes. The PP disks and already stacked 3 foliated PS blanks are then immediately stacked PP/(3 foliated PS)/PP, immediately forged and formed into a plastic article. The foliated sheets are encapsulated in the PP after forming.

The foliated PS blanks are useful for decorative purposes and also to demonstrate the usefulness of a foliated sheet of two different materials or a fiber composite in providing a controlled fiber orientation for a plastic article.

EXAMPLE 4

Two 4 inch diameter, 0.25 inch thick, 47 gram PP disks and one 4 inch diameter, 0.043 inch thick, 8.3 gram disk of SARAN resin ( a vinylidene chloride copolymer) are prepared. The PP disks are then heated in a forced air oven at about 163° C. for about 40 minutes. The SARAN resin disk was not heated. These disks are then stacked PP/SARAN resin/PP, forged into a preform and formed into a shallow draw container.

As can be seen in this example, by not heating the SARAN resin and by stacking, forging and forming, immediately after heating the PP disks, the heat history of the SARAN resin is minimized, thus reducing or eliminating potential resin degradation problems.

A second set of 5 inch diameter disks, heated and stacked as stated in Example 4 are also forged and formed into a deep draw container with a draw ratio (depth/diameter) of 1.3, where the diameter is 7 inches and the depth is 9.1 inches.

Both containers have encapsulated SARAN resin core layers and did not require the use of an adhesive or adhesive layer between the SARAN resin and PP encapsulating layers.

EXAMPLE 5

Three 5 inch diameter, 0.150 inch thick PP disks and two 5 inch diameter, 0.015 inch thick disks of SARAN resin are prepared. The PP disks are heated separately at about 166.5° C. for about 30 minutes, while the SARAN resin disks are not heated. These disks are then immediately stacked PP/SARAN resin/PP/SARAN resin/PP after heating, immediately forged into a preform and immediately formed into a deep drawn container having about a 7 inch diameter and a 9.1 inch depth. The SARAN resin layers are encapsulated and no adhesive layers are required.

EXAMPLE 6

Two 4.75 inch diameter by 0.25 inch thick, 65 gram PP disks and one 4.5 inch diameter, 0.25 thick, 61 gram high density polyethylene (HDPE) disk are prepared. The disks are then heated separately. The PP disks are heated at about 167° C. for about 40 minutes and the HDPE disk is heated at about 134° C. for about 40 minutes. These disks are then stacked PP/HDPE/PP so that the center points of each disk line up to form a central axis for the stacked layers. These disks are then forged and formed into a deep draw container in which the core layer of HDPE is completely encapsulated. In this example, by controlling the diameter of the HDPE disk and the heating temperature, the PP disks are made to completely encapsulate the core layer of HDPE.

EXAMPLE 7

One disk of polycarbonate (PC) 5 inch diameter, 0.150 inch thick and one disk of SARAN resin, 5 inch diameter, 0.015 inch thick are prepared. The PC disk is heated separately at about 166° C. for about 12 minutes. The unheated SARAN resin disk is then stacked on the PC disk and the stack is further heated at about 166° C. for about 3 minutes. The disks are then immediately forged between heated and lubricated anvils and immediately formed into a shallow draw plastic article.

A point to be noted by this example, is that while PC and SARAN resin, due to a large difference in processing temperatures and the tendency of the SARAN resin to thermally degrade, are not easily coextrudable into a multilayer sheet, they are, in this example, easily formed into a multilayer plastic article by separately heating and stacking individual layers of PC and SARAN resin.

EXAMPLE 8

Two disks of PC, 5 inch diameter, 0.150 inch thick and one disk of SARAN resin, 5 inch diameter, 0.015 inch thick are prepared. The PC disks are heated at about 167° C. for about 12 minutes. The disks are then stacked PC/unheated SARAN resin/PC and the stack is further heated at about 167° C. for about 3 more minutes in the forced air oven. The stack is then immediately forged between heated and lubricated anvils and immediately formed into a shallow draw part.

The combination of PC, which is a transparent high temperature resin and SARAN, an oxygen barrier resin in a PC/SARAN resin/PC structure is useful for high temperature barrier packaging, such as a transparent retortable container.

EXAMPLE 9

Two 4 inch diameter, 0.22 inch thick, 25 gram disks of ultra high molecular weight polyethylene (UHMWPE), two 4 inch diameter, 0.055 inch thick, 11 gram disks of styrene-butadiene-styrene (SBS) block copolymer and one 4 inch diameter, 0.15 inch thick, 33 gram disk of HIPS are prepared. All disks are heated separately in a forced air oven at about 143° C., however the UHMWPE disks are heated for about 60 minutes, while all other disks are heated for about 10 minutes. These disks are then stacked UHMWPE/SBS/HIPS/SBS/UHMWPE and immediately forged and formed between heated, lubricated anvils into a useful plastic article having an abrasion resistant surface with a rigid core.

To produce the layer structure UHMWPE/SBS/HIPS/SBS/UHMWPE by coextrusion, and thus a single multilayer blank useful for forming a plastic article, is, at best, extremely difficult and may be impossible at the present time.

EXAMPLE 10

Two disks of PP, 5 inch diameter, 0.150 inch thick and one disk of a multilayer structure HIPS/SBS/SARAN resin/SBS/HIPS, 4.75 inch diameter, 0.250 inch thick are prepared. The PP disks are heated at about 167° C. for about 20 minutes. The multilayer disk is heated at about 107° C. for about 20 minutes. The disks are then immediately stacked, immediately forged and immediately formed into a plastic article.

The example shows that a disk or layer can itself be a multilayer structure.

EXAMPLE 11

Two square blanks 3.5 inches on each side, and 0.25 inch thick are cut from an extruded sheet of HDPE. These square blanks are then heated at about 133° C. for about 40 minutes in a forced air oven. These square blanks are then stacked at a forty-five degree angle around a common central layer axis relative to each other. The stacked square blanks are then immediately forged into a circular preform between anvils heated to about 130° C. with a forge dwell time of about 2 seconds. The anvils are lubricated with silicone mold release aerosol prior to forging. The circular preform is then formed into a plastic article. By marking square blanks, prior to heating with a grid of colored circles and colored meridian lines, it is possible to note that the grid of colored circles for two angularly disposed square blanks persist in a forged circular preform for a greater distance from the center axis than does the grid of colored circles in a single square blank forged into a circular preform. This uniformity of orientation provides uniform physical properties and increased dimensional stability for a plastic article.

EXAMPLE 12

Two 3.5 inch diameter, 0.25 inch thick, 35 gram disks are cut from extruded PP sheet. Two 2.5 inch diameter, 0.012 inch thick disks are also cut from the PP sheet and a 2.5 inch diameter, 0.008 inch thick PP screen are also prepared. The screen, which has a rectangular grid may be viewed as two sets of parallel fibers oriented perpendicular to each other. The two 3.5 inch diameter PP disks are then heated in a forced air oven at about 163° C. for about 32 minutes. The other disks are not heated. The disks are then stacked PP(3.5 inch diameter)/PP(2.5 diameter)/PP(screen)/PP(2.5 inch diameter)/PP(3.5 inch diameter), immediately forged into a preform between lubricated anvils heated to about 163° C. and formed into a 7 inch diameter, 1.75 inch deep pan. The screen is deformed into about a 6 inch diameter circular region.

While a screen layer is utilized in this example, it is easily seen that any thermoplastic material which contain discontinuous or continuous oriented fibers may also be of use. Also, using a sufficiently conductive polymer, the plastic article may be useful as an electromagnetic shield.

EXAMPLE 13 AND COMPARATIVE EXAMPLES 13

Two 3 inch diameter, 0.25 inch thick HIPS disks and a 0.25 inch thick rib section of GPPS having four protrusions from the center axis (in the shape of an X) are prepared. For comparison purposes, three 2.6 inch diameter by 0.25 inch thick HIPS disks are also prepared. Both the example layers and comparative example layers have an identical total weight of 68 grams. All layers are then heated separately at about 121° C. for about 15 minutes in a forced air oven. The example disks are then stacked HIPS/GPPS/HIPS. The comparative example disks are also stacked HIPS/HIPS/HIPS. Both the example and the comparative example are then forged between heated and lubricated anvils and formed into shallow pans approximately 7 inches in diameter by 1.75 inches deep. The example shallow pan has a translucence with the ribs showing obviously in the shallow pan interior. Also in the shallow pan interior, the ribs are slightly raised, while the shallow pan exterior remained smooth.

The two shallow pans are crushed in an Instron Universal testing machine using a 10,000 pound compression load cell and proper fixtures to maintain total top and bottom shallow pan support. The tests are run at 0.05 inch per minute crosshead for the first 0.2 inch of deflection and then increased to a 5 inches minute crosshead until a peak value is reached. To obtain normalized values, lines are drawn tangent to the beginning portion of the curve and the load (in pounds) read at 0.05 inches of deflection. Table I summarizes loads and bottom thickness data.

TABLE I

| | Load (pounds) 0.05 inches Deflection | Peak | Bottom Thickness Inches |
|---|---|---|---|
| Example 13 | 84 | 1100 | 0.030 |
| Comparative Example 13 | 56 | 1199 | 0.037 |

As the data indicates, the stiffness of a plastic article may increase by utilizing ribs of a thermoplastic material which is different and preferably of a higher modulus than outer layer thermoplastic materials.

The stiffness may also be controlled by adding or subtracting the number of ribs in the core. Encapsulation of one or more core layers, while not required, is useful in numerous applications. For example, a conveyor bucket may have a rigid core layer encapsulated between two rubbery abrasion resistant encapsulating layers. Encapsulation of a core layer may avoid the need of an adhesive or adhesive layer between layers of diverse material and constrain the flow of the core layer during the forming of a plastic article so as to provide a constant and plug flow and thus an improved plastic article. Ribs, annular cores or other shapes may be encapsulated to control the strength of a part or enhance the decorative properties. Utilizing fiber composite layers allows close control of fiber orientation. Thus, the directional mechanical properties of the plastic article can be controlled to correspond to the intended use of the plastic article. Such articles include containers and machine housings.

While certain representative embodiments and details have been shown for the purpose of illustrating the invention, it will be apparent to those skilled in the art that various changes and modifications may be made without departing from the spirit and scope of the present invention.

What is claimed is:

1. A process for forming a plastic article comprising the steps of:
    (a) heating separately at least one layer of a plurality of diverse layers of thermoplastic material to a temperature not to exceed the melting temperature of any thermoplastic material in the layer to be heated, the total thermoplastic material in the plurality of diverse layers being sufficient to form the plastic article;
    (b) stacking the plurality of diverse layers immediately after heating at least one layer and immediately prior to forging;
    (c) providing lubrication for the plurality of diverse layers of thermoplastic material sufficient to permit substantial plug flow of the plurality of diverse layers of thermoplastic material during forging;
    (d) forging the plurality of diverse layers of thermoplastic material by substantial plug flow in a mold heated to a temperature at least as high as the lowest softening temperature of any thermoplastic material present in the plurality of diverse layers of thermoplastic material into a preform whose peripheral portion is rapidly cooled below the softening temperature while being retained;
    (e) immediately thermoforming the preform into the plastic article having a desired shape and size; and
    (f) permitting the plastic article to cool.

2. A process for forming a plastic article as recited in claim 1 wherein the plurality of diverse layers further comprises at least three diverse layers of thermoplastic material, at least two of which layers are of similar thermoplastic material and the two layers of similar thermoplastic material are stacked so as to be first and last layers.

3. A process for forming a plastic article as recited in claim 2 wherein the similar thermoplastic material of the first and last layers completely encapsulates all layers of diverse material upon forging the preform.

4. A process for forming a plastic article as recited in claim 1 wherein at least one of the plurality of diverse layers is oriented.

5. A process for forming a plastic article as recited in claim 3 wherein at least one layer of encapsulated diverse material is oriented.

6. A process for forming a plastic article as recited in claim 4 wherein at least two of the plurality of diverse layers are oriented and the oriented layers are stacked so as to provide a layered angular orientation.

7. A process for forming a plastic article as recited in claim 5 wherein there are at least two layers of encapsulated diverse material which are oriented and the encapsulated, oriented layers are stacked so as to provide a layered angular orientation.

8. A process for forming a plastic article as recited in claim 1 wherein at least one of the plurality of diverse layers comprises ribs of thermoplastic material.

9. A process for forming a plastic article as recited in claim 3 wherein at least one layer of encapsulated diverse material comprises ribs of thermoplasic material.

10. A process for forming a plastic article as recited in claim 1 wherein at least one of the plurality of diverse layers is a briquette of thermoplastic powder material.

11. A process for forming a plastic article comprising the steps of:
(a) heating separately at least one layer of a plurality of similar layers of thermoplastic material to a temperature not to exceed the melting temperature of any thermoplastic material in the layer to be heated, the total thermoplastic material in the plurality of similar layers being sufficient to form the plastic article;
(b) stacking the plurality of similar layers of thermoplastic material, so as to provide a layered angular orientation, immediately after heating at least one layer and immediately prior to forging;
(c) providing lubrication for the plurality of similar layers of thermoplastic material sufficient to permit substantial plug flow of the plurality of layers of thermoplastic material during forging;
(d) forging the plurality of similar layers of thermoplastic material by substantial plug flow in a mold heated to a temperature at least as high as the softening temperature of any thermoplastic material present in the plurality of similar layers of thermoplastic material into a preform whose peripheral portion is rapidly cooled below the softening temperature while being retained;
(e) immediately thermoforming the preform into the plastic article having a desired shape and size; and
(f) permitting the plastic article to cool.

12. A process for forming a plastic article as recited in claim 11, wherein the plurality of similar layers of thermoplastic material are polygonal in shape, the preform shape after forging is circular, and the polygonal plurality of similar layers of thermoplastic material are stacked in a manner so as to approximate the circular preform shape and provide a layered angular orientation.

13. A process for forming a plastic article as recite in claim 12 wherein the polygonal plurality of similar layers of thermoplastic material are oriented in a like manner.

14. A process for forming a plastic article as recited in claim 11 wherein the plurality of similar layers of thermoplastic material are circular in shape and oriented in a like manner.

* * * * *